Patented Jan. 14, 1936

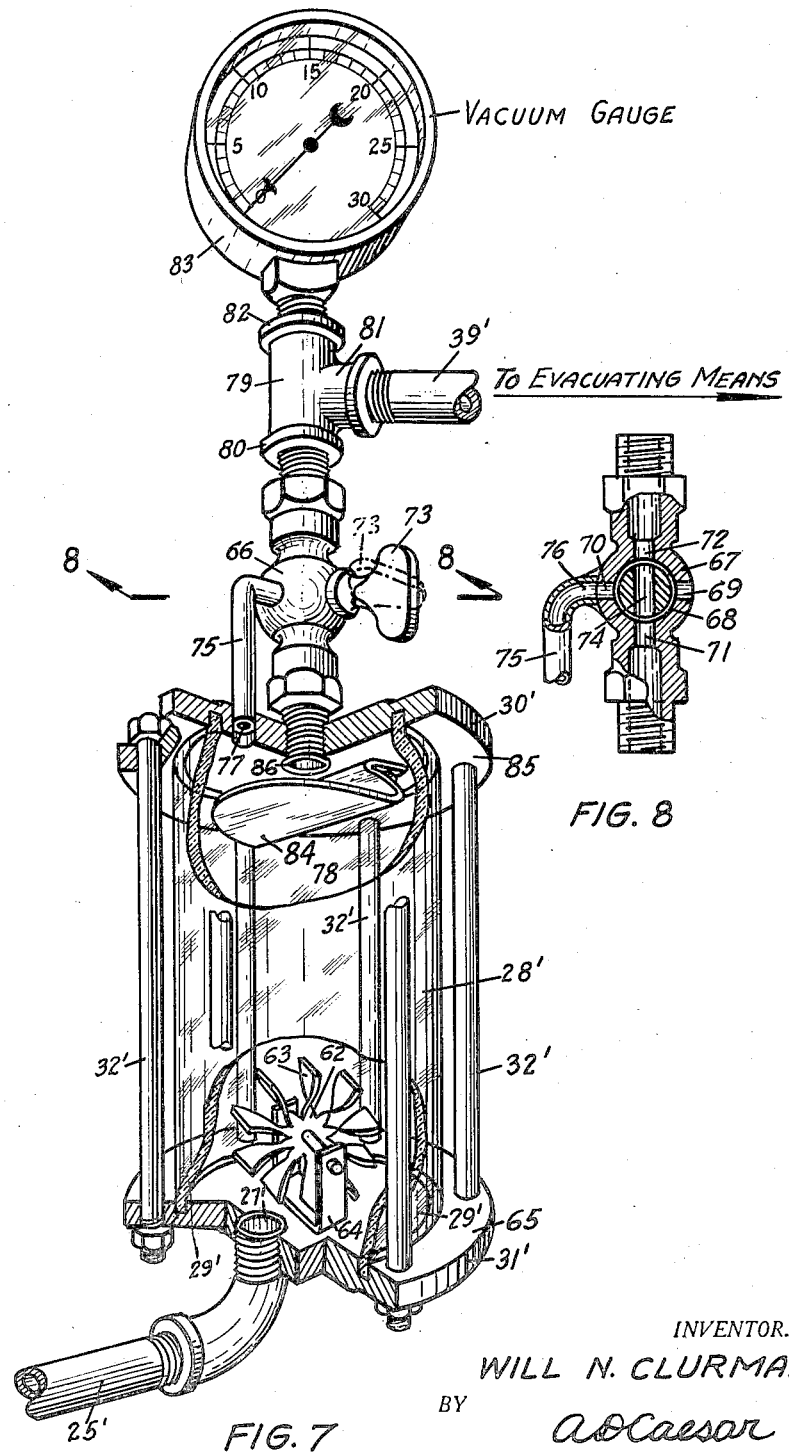

2,027,417

UNITED STATES PATENT OFFICE 2,027,417

METHOD AND MEANS FOR INDICATING THE FLUID CONTENT OF A CONTAINER

Will N. Clurman, Philadelphia, Pa.

Application March 30, 1933, Serial No. 663,584

15 Claims. (Cl. 116—118)

This application is a continuation in part of application Serial No. 593,282 for Method and means for indicating the fluid content of a container filed by me on February 16, 1932.

This invention relates to a method and means for indicating the fluid content of a container and has as its object the provision of a new and improved means for this purpose.

My discovery has particular application to fluid systems wherein fluid must be periodically replenished, wherein the main fluid reservoir or container is so situated as not to be readily accessible, and wherein it is desired that the person replenishing the fluid supply should know the amount of fluid in the container or reservoir so as to avoid any fluid overflow during the replenishing operation. An example of such a system is that associated with oil burning heaters.

In many homes having oil burning heaters, the oil tank or reservoir is situated in the cellar of the home. Since the fuel may be supplied to the reservoir by means of a supply line, the intake end of which is situated at some point outside of the cellar, the person who is replenishing the fuel supply cannot readily know the amount of oil in the reservoir unless he takes repeated trips to the cellar and studies the gauge upon the tank. If, as often happens, there is no one home when the replenishing supply of oil is brought to the house, the oil cannot be properly delivered. For, in such case, the cellar is usually locked and the driver cannot risk an overflow of the tank. This is not only because of the loss of oil but especially because of the fact that it is almost impossible to so clean up the cellar as to remove all traces of the oil which had overflowed. (The reason that it often happens that a housewife having ordered oil is not at home to receive it is because she fully believes that the tank can easily be replenished by means of its supply pipe and does not realize that it is necessary to check the tank gauge during the filling operation.) It is an object of this invention to obviate the above difficulties which exist in the replenishing of fluid systems of which the oil system above referred to is only an example.

More particularly stated, one of the objects of my invention is to evolve a method whereby an operator, who is engaged in replenishing the fluid supply of a fluid system, the reservoir or container of which is inaccessibly situated, may know when the fluid in the said container or reservoir has reached a certain predetermined point and that a certain predetermined quantity of fluid is in the said reservoir or container.

Another object of this invention is to supply means for indicating to an operator engaged in replenishing the supply of fluid in an inaccessible reservoir the fact that the fluid in the reservoir had reached a certain predetermined point and a certain predetermined quantity of fluid is in the said reservoir.

Another object of this invention is to provide the said means for indicating the fluid content of a system with means for causing ebullience of the fluid which enters the said indicating means.

The above objects are attained in the structures which are more particularly described in the following specifications and the drawings which form a part thereof.

In the drawings, Figure 1 is a schematic view showing my device operatively connected to and forming part of the oil supply and reservoir portion of an oil burning heater. The component elements of the ensemble are shown in perspective and parts of the same are broken away for the purpose of clearness. Further, such portions of certain well known elements which in and of themselves do not form a part of my novel combination but which are associated with or carried by the elements which do form a part of my novel combination having been either omitted, broken away or schematically illustrated.

Figure 2 is an enlarged schematic perspective view showing that portion of my combination which constitutes a permanent portion of the tank installment connected to that portion of my invention which is attachable to the fixed element for the purpose of completing my novel combination. Elements are shown in section or broken away wherever it is thought advisable or necessary for the purpose of clearness. Full lines indicate one of the operative positions of the valves 33 and 37, while dot and dash lines indicate another of the operative positions of the said valves.

Figure 3 is a fragmentary view showing one method of connecting the hose to the intake manifold, the portion of tubing which is directly joined to the intake manifold being greatly increased in size for the purpose of clearness and the tubing representing the intake manifold being decreased in size for the purpose of saving space. Portions of the elements making up the fragments shown are broken away or shown in section for the purpose of clearness wherever the same is thought necessary.

Figure 4 is a view of a fragment of the manifold 2 to which the hose is to be joined showing the same as it appears before the hose is attached.

Figure 5 is a view taken similar to Figure 3 showing a somewhat modified structure of the manifold 2 and a modified manner of attaching the said hose to the said tube.

Figure 6 is a view taken generally similar to Figure 4 showing another means for closing the hose attaching opening in the intake manifold when the hose is not attached thereto.

Figure 1:
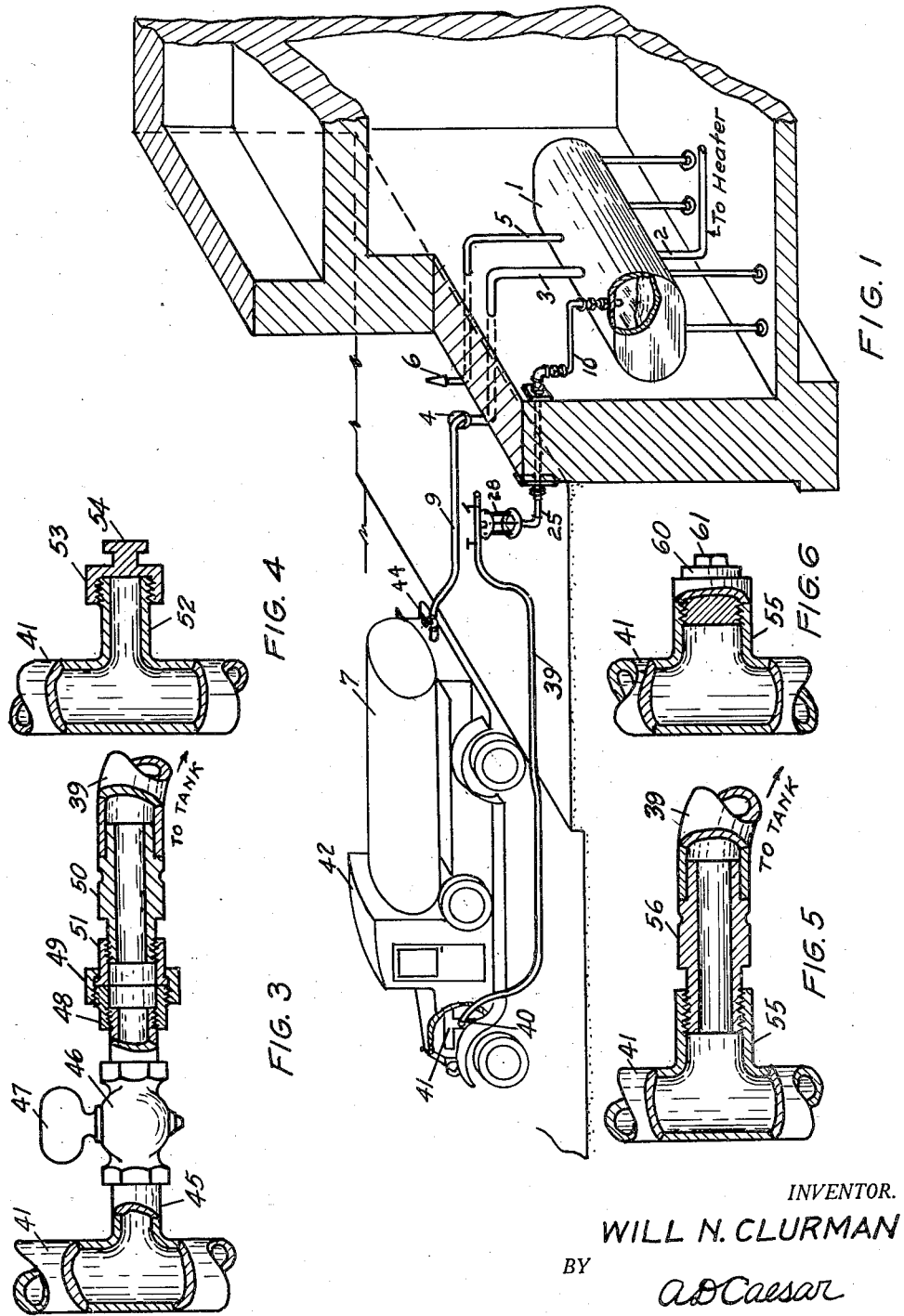

Figure 7 is a perspective view of a modified indicator member having mounted therein means for causing ebullience of the fluid which may enter said member. Parts of the indicator member have been broken away for the purpose of clearness. Fragments of the connecting lines leading to and from the indicator member are attached thereto and a vacuum gauge is shown positioned at a point in the line leading to the evacuating means. The evacuating connection position of the valve stop-cock is shown by the full lines and the atmospheric connection position of the valve is shown by the dot and dash lines.

Figure 8 is a view partially in section taken in the direction of the line 8—8 of Figure 7.

Referring more particularly to the drawings wherein similar reference numerals denote similar parts, reference numeral 1 denotes the oil tank or reservoir of a heating system which is here shown as installed within the cellar of a home. Reference numeral 2 shows the supply pipe leading from the tank to the heater, reference numeral 3 shows the intake pipe having its intake opening at 4, reference numeral 5 indicates the vent pipe terminating in the vent opening 6. Reference numeral 7 denotes the tank carried by a refueling truck 42. The tank 7 has the outlet valve 44 to which is attached the one end of the hose 9, the other end of which is attached to the intake opening 4 of the intake pipe 3. The elements mentioned in this paragraph in and of themselves do not constitute a part of my invention and since they are well known in the art they will not be here further described.

Attached to the tank or reservoir 1 is a pipe 10 one end 11 of which extends into the tank 1 to a depth where the volume of the tank remaining above the terminal portion 12 of the said end 11 is greater than the combined volumes of the intake pipe 3, the supply hose 9, the pipe 10, and the portions 19 and 25 associated with the said pipe 10. The pipe 10 and its associated elements constitute and form the intake element for the said indicator 28. The end 11 of the pipe 10 extends through a suitable drilled aperture in a compression fitting which in turn is threadably mounted in the upper portion 14 of the body member of the tank 1 as shown. The compression fitting 13 extends through and is threadably engaged by a jamb nut 15 which serves to lock the compression fitting 13 and the pipe which it carries in position. It is to be noted, however, that the point of connection between the pipe 10 and the tank 1 need not be air tight. It is only necessary that the pipe 10 and the other elements in the line directly associated with it and leading to the evacuating means (see Figure 2) be air tight. The second end 16 of the pipe 10 is received within the compression fitting 17 which in turn is attached to the inner end 18 of the indicator attaching tube 19 which extends through the basement wall 20 as shown. The outer end 21 of the tube 19 terminates in the externally threaded element 23 which cooperates with the internally threaded union member 24 carried by the inner end 26 of the pipe 25 to detachably connect the said pipe 25 to the pipe 19. The other end 27 of the pipe 25 terminates in the floor member 31 of the indicator 28.

The indicator 28 is an air tight chamber formed by the walls 29 made of glass or other transparent material, a ceiling or upper bounding member 30, a floor or lower bounding member 31 held together and reinforced by the tie rods 32. The tie rods 32 also serve to guard the transparent member 29 against breakage. Positioned in the ceiling member 30 so as to form a communicative connection with the chamber of the indicator 28 is a vertical member 36 of the T connecting pipe member 35. The said T connecting member 35 terminates at one of its ends in a valve 33 which is controlled by the stop cock 34. The valve 33 is so formed that in one of its positions it permits communication between the chamber of the indicator 28 and the nozzle 43. The other end of the said T member 35 terminates in a valve 37 controlled by the stop cock valve 38. Connected to the valve 37 is one end of the hose 39, the other end of which is threadably and detachably connected to the intake manifold 41 of the auto truck 42 as at 40.

Although many methods of attachment of the hose 39 to the intake manifold 41 readily suggest themselves, the following are here given for the purpose of illustration: The manifold (see Figure 3) may be provided with an outlet tube 45 having a valve 46 attached thereto and which terminates in the externally threaded portion 48 which cooperates with the union member 49 carried by the member 51 of the nozzle 50 of the pipe 39 to join the pipe 39 to the tube 45. The valve 46 is controlled by the stop cock 47. By leaving the stop cock 47 in the position shown in Figure 3, communication is established between the hose 39 and its associated elements and the intake manifold 41. When the pipe 39 is not connected to the tube 45, communication of the intake manifold 41 with the atmosphere is broken by turning the stop cock 47 at right angles in the position shown in Figure 3.

The disclosure of Figure 4 differs from that shown in Figure 3 in that the manifold member 41 terminates in an externally threaded tube 52 which is adapted to have threadably mounted thereon an internally threaded nozzle carried by the hose 39. When the hose 39 is not attached to the intake manifold 41, the opening of the tube 52 is closed by means of the internally threaded cap 53. The cap 53 has a handle 54 formed thereon for the purpose of aiding the operator in putting the same on and taking it off.

The disclosure of Figure 5 differs from that of Figure 3 in the fact that the intake manifold 41 terminates in an internally threaded tube 55 which is adapted to receive an externally threaded end of the nozzle 56 carried by the hose 39. When the hose 39 is not attached to the tube 55, the opening of the said tube 55 is closed by a plug 60 as shown in Figure 6. The plug 60 terminates in a square or hexagonal head in order that it may be gripped by a tool for the purpose of easy removal and insertion.

Although the method of connecting and using my device is believed to be obvious from the foregoing description, yet to obviate any possible misunderstanding, the following detailed description is here given.

The novel apparatus can be viewed as a combination consisting of a fixed portion and a movable portion detachably connected thereto. The fixed portion consists of the pipe 10, the elements 13 and 15 which connect it to the tank 1, the elements 17 and 18 which connect it to the indicator attaching tube 19, the various line connecting fittings and the indicator attaching tube or pipe 19. The detachable movable portion consists of the pipe 25, the union member 24, the indicator 28, the T connecting pipe 35, the valves 33 and 37, the nozzle 43, the tube 39 and the intake manifold 41 of the truck 40. The pipe 25, the indicator 28, the valves 33 and 37, the nozzle 43 and the hose 39 constitute a single unit but may be made as independent elements and supplied with suitable union members at the necesary ends for the purpose of attachment and assembly.

The fixed portion of my novel combination is installed at the same time that the tank and the associated fixed elements of the heating system are put in. The pipe 10 is so positioned that the distance H between its terminus 12 and the top wall 14 of the tank 1 will be such that the volume of the tank in the portion above the end 12 or the pipe 10 is greater than the combined volumes of the intake pipe 3, the supply hose 9, the pipe 10, the indicator connecting pipes 19 and 25 and the elements which serve as connecting links in the line from the terminus 12 of the pipe 10 to the floor 31 of the indicator member 28. When the pipe 10 is properly positioned to meet the above requirements, it is locked in place by the jamb nut 15.

It is obvious from the above that the distance H varies for different installation but that it can be readily calculated for any given installation. For, in all cases the diameter and lengths of the pipes 3, 9, 10, 19, 25, and the connecting elements in the line are known. The pipes being cylinders, the volume of each cylinderical element would be $\pi dl$ where $d$ is the internal diameter of each pipe or tubular element and $l$ is its length. The total volume of all of the controlling factors above set forth is obtained by adding the volumes of the component units. This total or combined volume must be less than the volume of that portion of the tank between the lower terminus 12 of the pipe 10 and the top bounding portion 14 of the said tank. The required difference in volume is a factor of safety being fixed in the manner which will be hereinafter set forth. This fixes the volume of that portion of the tank bounded by a horizontal plane at the terminus 12 of the pipe 10 and the tank walls above this plane. The height H can now be determined since the shape of the tank is known.

To illustrate concretely:

Suppose the volume of the pipe 3 is 720 cu. in., that of the hose 9 is 432 cu. in., and that of the pipe 10, the portions 19, 25 and the associated elements is 30 cu. in. The combined volume of the controlling factors is therefore 720+432+30=1182 cu. in.

This volume must be less than the volume which will be left in the tank above the terminus 12 of the pipe 10. Let us assume that we desire that this difference in volume should be 1018 cu. in. In other words, we desire to provide a factor of safety volume of 1018 cu. in. The tank volume which should exist above the terminus 12 of the pipe 10 is therefore 1182+1018=2200 cu. in.

For ease in calculation let it be assumed that the tank is oblong in shape, that its length is 60 inches and that its width is 24 inches.

The volume V remaining above the terminus 12 of the pipe 10 can be expressed mathematically in the formula L×W×H where L=Length of the tank
W=Width of the tank
H=Depth to which the end 11 of the tube 10 must extend Then L×W×H=desired volume or V Now where L=60 in. as above stated
where W=24 in. as above stated
where V=2200 cu. in.

we obtain by making the necessary substitutions in the formula L×W×H=V and solving the following 60×24×H=2200 cu. in.
H=1.25 inches.

Where the reservoir is some shape other than an oblong it is of a regular well known figure such as a cylinder the formula for that portion of the volume of which is above the terminus 12 is either known in terms of H or can readily be determined. This formula is substituted for its equivalent the formula L W H above set forth in the equation L×W×H=V. In each case, however, all of the terms except H would be known.

Having installed the permanent portion of my indicator as above set forth, we are ready for a delivery of oil to the system. Upon the arrival of the refueling truck at the premises the operator connects the detachable portion of the indicator to the permanent portion by proper manipulation of the rotatable and movable union element 24 which connects the pipe 25 to the pipe 19. The hose 39 is now connected to a point on the intake manifold of the motor. The connection may be by means of a union carried on an end of the hose 39 for threadable engagement with an externally threaded outlet pipe carried by the intake manifold 41 and normally closed by a cap or may be by means of a threadable connection formed by an externally threaded element carried by the hose 39 and an internally threaded outlet pipe carried by the intake manifold 41 and normally closed by a bushing. The valves 33 and 37 are then made to assume the positions shown by the full lines in Figure 2. In this position the valve 33 is closed and the valve 37 is open so as to permit communication between the indicator chamber 28 and the hose 39. The oil supply hose 9 is so positioned as to deliver oil into the intake end 4 of the intake pipe 3. The valve 44 is now opened and oil begins to flow from the refueling tank 7 into the tank 1. As the oil flows in it displaces the air which is in the tank 1 and forces it out of the opening 6 in the vent pipe 5. As soon as the valve 44 is opened the operator starts the motor of his car. This causes a suction in the intake manifold which exhausts the air in the tank 1 since there is a direct communication with the tank through the following element— the hose 39, the open valve 37, the T 35, the lower open end of the element 36 of which communicates with the indicator chamber 28, the pipe 25, the connecting element 26, the pipe 19, the connecting elements 17 and 18 and the pipe 10. When the oil which is being fed into the tank reaches a level where it contacts with the open end terminus 12 of the pipe 10 it will be drawn up the said pipe, come up through the aperture 27 in the floor member 31 and appear in the indicator chamber 28. This is a signal to the operator that the predetermined point has been reached. He immediately turns off the valve 44 and turns the stop cocks 34 and 38 causing them to assume the position shown by the dot and dash lines in Figure 2. In this position communication with the hose 39 is cut off and communication with the nozzle 43 is established. Air now enters into the chamber 28 through the nozzle 43. The vacuum in the pipes 10, 19 and 25 being broken the oil in the said pipes and in the indicator chamber 28 drops back into the tank. In the meantime, the oil which was in the pipes 9 and 3 at the time the valve 44 was closed also enters the tank. It is now obvious that the volume left in the tank above the terminus 12 of the pipe 10 was for the purpose of receiving the balance of the oil in the pipes 3 and 9 after the valve 44 is closed, for receiving the oil drawn into the pipes 10, 19, 25 and the indicator chamber 28, and for leaving sufficient space for receiving oil which is certain to flow from the refueling truck from the time the oil appears in the indicator chamber until the operator fully closes the valve 44. Therefore, the volume by which the space in the tank above the terminus 12 of the pipe 10 must be greater than the combined volumes of the pipes 3, 9, 10, 19, 25, the indicating chamber 28 and the connecting links in the line 10, 19, 25 is that volume of oil which is certain to flow in the time that an average operator can close the valve 44 after he sees the oil in the indicator chamber plus a certain factor of safety decided upon by the designer of the unit. The amount of time which will ordinarily elapse beginning with the moment the operator sees the oil in the indicator chamber and ending with the moment that the valve 44 is closed can easily be determined by experiment. I have found that it usually takes five seconds. The maximum oil which flows during that time can readily be calculated or readily determined by experiment. I have found that with the standard equipment now in use by the Petro Oil Company 60 cu. in. of oil will flow. I have taken 958 cu. in. as a factor of safety. My arbitrary figure by which the tank volume above the terminus 12 must exceed the pipes 3, 9, 10, 19, 25, the indicator chamber 28 and the connecting elements in the line 10, 19, 25 is therefore 1018 cu. in. This, however, is to be understood as a figure fixed by me with the equipment used by me. For any other equipment it can readily be determined by following the rules hereinabove set forth.

It is obvious that each fuel replenishing operation is an exact repetition of the procedure hereinabove outlined and involves the same procedure.

Figure 2:
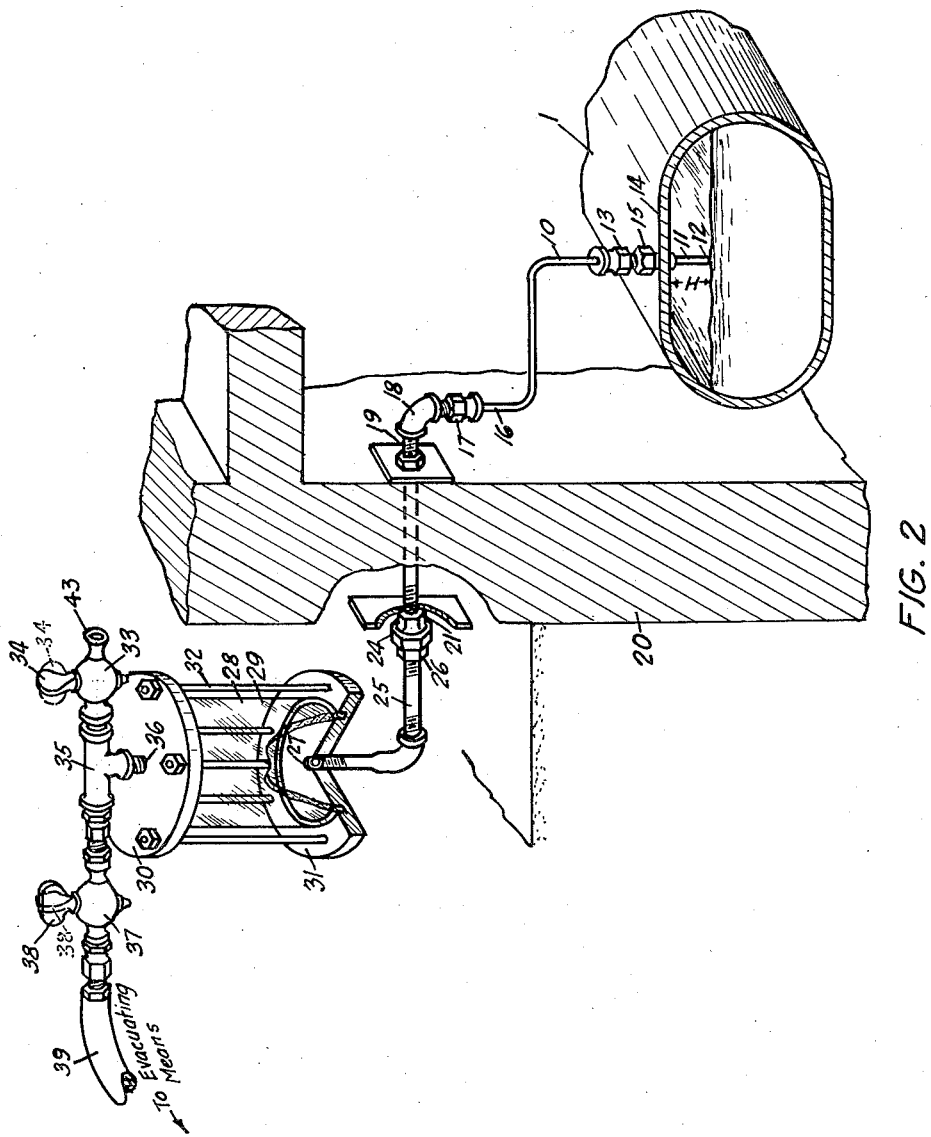

One of the many possible modifications of my device is shown in Figures 7 and 8 which illustrate a structure generally similar to that shown in Figures 1 and 2 and which differs therefrom in the fact that this indicating member has means positioned therein for causing ebullience in the fluid which enters the said member, and in the fact that a vacuum gauge has been placed in the line leading to the evacuating means.

Referring more specifically to the disclosure of Figures 7 and 8 the indicator member 28', consisting of an air tight chamber formed by the walls 29' of glass or other transparent material, the ceiling and floor members 30' and 31' respectively held together and reinforced by the tie rods 32', is generally similar to the indicator member 28', shown in Figures 1 and 2, and differs therefrom in the following particulars:—

(1) A wheel 62 having a plurality of flat blades 63 formed thereon is rotatably mounted in a yoke 64 attached to the inner surface 65 of the floor member 31'. The wheel 62 is so positioned that the blades 63 will come directly above the opening 27' of the pipe 25', which serves as one of the elements to connect the indicator member 28' with the container 1, and will be struck by the current of fluid which rushes into the indicator member 28' from the container 1. The impingement of the fluid upon the blades 63 causes the fluid to spatter and the wheel 62 to rotate. The rotation of the wheel 62 agitates the fluid which is entering the member 28' causing ebulliency therein. This activity on the part of fluid enables the operator engaged in replenishing the fuel supply to readily determine that the fluid has entered the chamber 78 even when the walls 29' are dirty or when the fluid being supplied is colorless.

(2) For the valves 33, 37 and associated elements shown in Figures 1 and 2 there are substituted the two way valve 66 and the by pass tube 75. The valve 66 consists of the valve seat member 67 which has a bore 68 formed therein which receives the stop cock 73 which has a bore 74 formed therein. The walls of the valve seat member 68 have formed therein the horizontal openings 69 and 70 and the vertical openings 71 and 72. The horizontal opening 69 communicates with the atmosphere while the horizontal opening 70 communicates with the upper end 76 of the by pass tube 75, the lower end 77 of which communcates with the chamber 78 of the indicator member 28'. The vertical opening 71 communicates with the chamber 78 while the vertical opening 72 communicates with the end 80 of the T member 79', the portion 81 of which is connected to the line 39' leading to the evacuating means and to the end 82 of which is connected to the vacuum gauge 83.

(3) A baffle plate 84 is attached to the inner surface 85 of the ceiling member 30' and positioned so as to protect the opening 86 leading to the valve 66.

The indicator member occupies the same position in the line as the member 28 and functions as follows:—

When it is desired to connect the tank 1 to the evacuating means (when oil delivery is being made) the stop cock 73 is turned to occupy the position shown by the full lines in Figure 7. In this position the apertures 71, 74 and 72 are in registry as shown in Figure 8 and air flows from the tank 1 to the evacuating means. The moment fluid reaches the predetermined point in the tank 1 it rushes up the connecting pipe 10, etc. through the aperture 27' and impinges against the blades 63 of the wheel 62 with resultant spattering and causes the wheel to rotate which causes ebullience in the fluid entering the chamber 78. Upon the appearance of fluid in the chamber 78 the operator turns the stop cock 73 to the position shown by the dotted lines in Figure 7. In this position the apertures 70, 74 and 69 are in registry, the connection with the evacuating means is closed and air flows from the atmosphere into the chamber 78.

The above disclosure is to be understood as being by the way of illustration only and not by the way of limitation since many changes may be made in the disclosure herein shown without departing from the spirit of my invention which consists in so associating an indicating means with a fluid system that it communicates with the said system at a predetermined point and in drawing the fluid into the said indicating means when the fluid in the said fluid system reaches the said predetermined point.

Many changes in the means here shown for carrying out my invention and equivalents for the means here shown to accomplish my objects and the functions of the device here disclosed will now readily suggest themselves to those skilled in the art.

For that reason it is my desire that the claims which are hereto appended for the purpose of defining my invention should be limited only by the prior art.

Having described my invention what I claim as new and useful is:

1. Means for indicating to an operator engaged in replenishing the supply of fluid in a reservoir that the fluid in the said reservoir has reached a certain predetermined point which consists of the combination of a tubular element inserted into the said reservoir so that its free end is at the said predetermined point, a substantially air tight indicating chamber having its floor member attached to the other end of the said tubular means and positioned so as to be visible to the said operator, a valve positioned in the roof member of the said chamber, the said valve in its open position permitting communication of the said chamber with the atmosphere and preventing such communication in its closed position, a second valve positioned in the said roof member, tubular means having one of its ends connected to the said second valve and the other of its ends connected to the intake manifold of a gasoline motor, the said second valve being formed for permitting, in one of its positions, communication between the said tubular means connecting the said second valve to the said intake manifold and the said indicating chamber, and for preventing such communication in its closed position.

2. The method of determining when sufficient oil has been added to a reservoir the fluid supply of which is being replenished through an intake pipe and a supply device which consists in inserting a tubular element into the top of the said reservoir a distance such that the volume of the said reservoir above the terminal point of the said tubular element is greater than the combined volumes of the intake pipe for the said reservoir, of the supply device from the refueling tank and of the said tubular element, providing the said tubular element with an indicating means, partially evacuating the said tubular element, and maintaining the said partial vacuum until the fluid becomes visible in the said indicating means.

3. Means for indicating when sufficient fluid has been added to a reservoir the fluid supply of which is being replenished which consists of an intake element having one of its ends positioned within the said reservoir and the other of its ends terminating at a point outside the chamber within which the said reservoir is situated, indicating means detachably connected with that end of the intake element terminating outside of the said reservoir chamber, and evacuating means detachably connected to the said indicating means, the mouth of the said intake element being positioned at a point within the said reservoir where the volume of the said reservoir above the said mouth is greater than the combined volumes of the intake pipe for the said reservoir, the supply line from the refueling tank, and the said intake element.

4. Means for indicating to the operator engaged in adding fluid to a reservoir when sufficient fluid has been added thereto consisting of a tubular member the intake end of which is positioned at a point within the said reservoir and the other end of which terminates at a point outside of the chamber within which the said reservoir is situated, an indicating chamber having at least some portion thereof made of transparent material, detachably connected with that end of the tubular member terminating outside of the said reservoir chamber, evacuating means detachably connected to the said indicating means, the intake end of the said tubular member being positioned at a point within the said reservoir where the volume of the said reservoir above the said end is greater than the combined volumes of the intake pipe of the said reservoir, the supply line from the refueling tank, and the said tubular member.

5. The method of determining when sufficient fluid has been added to a reservoir the fluid supply of which is being replenished from a refueling tank by means of the supply line connecting with an intake pipe connected to the said reservoir which consists in inserting an intake element into the top of the said reservoir a distance such that the volume of the said reservoir above the terminal point of the said intake element is greater than the combined volumes of the intake pipe for the said reservoir, of the supply line from the said refueling tank, and of the said intake element, providing the said intake element with an indicating means, drawing the said fluid into the said indicating means when the fluid in the said reservoir reaches the said terminal point of the said intake element, and causing an ebullience in the said fluid drawn into the said indicating means.

6. Means for indicating when sufficient fluid has been added to a reservoir the fluid supply of which is being replenished which consists of an intake member having one of its ends positioned within the said reservoir and the other of its ends terminating at a point outside the chamber within which the said reservoir is situated, indicating means connected with that end of the intake element terminating outside of the said reservoir, means for producing ebullience in the said fluid positioned within the said indicating means, and evacuating means connected to the said indicating means, the mouth of the said intake element being positioned at a point within the said reservoir where the volume of the said reservoir above the said mouth is greater than the combined volumes of the intake pipe for the said reservoir, the supply line from the refueling tank, and the said intake element.

7. Means for indicating to the operator engaged in adding fluid to a reservoir when sufficient fluid has been added thereto consisting of a tubular member the intake end of which is positioned at a point within the said reservoir and the other end of which terminates at a point outside of the chamber within which the said reservoir is situated, an indicating chamber having at least some portion thereof made of transparent material detachably connected with that end of the tubular member terminating outside of the said reservoir, means for producing ebullience in the said fluid positioned within the said indicating means, evacuating means detachably connected to the said indicating means, the intake end of the said tubular member being positioned at a point within the said reservoir where the volume of the said reservoir above the said end is greater than the combined volumes of the intake pipe of the said reservoir, the supply line from the refueling tank, and the said tubular member.

8. Means for indicating to the operator engaged in adding fluid to a reservoir when sufficient fluid has been added thereto consisting of a tubular member the intake end of which is positioned at a point within the said reservoir and the other end of which terminates at a point outside of the chamber within which the said reservoir is situated, indicating means connected with that end of the tubular member terminating outside of the said reservoir chamber, evacuating means connected to the said indicating means, the intake end of the said tubular member being positioned at a point within the said reservoir where the volume of the said reservoir above the said end is greater than the combined volumes of the intake pipe of the said reservoir, the supply line from the refueling tank, and the said tubular member.

9. Means for indicating when sufficient fluid has been added to a reservoir the fluid supply of which is being replenished which consists of an intake element having one of its ends positioned within the said reservoir and the other of its ends terminating at a point outside the chamber within which the said reservoir is situated, indicating means connected with that end of the intake element terminating outside of the said reservoir chamber, and evacuating means connected to the said indicating means, the mouth of the said intake element being positioned at such a point within the said reservoir where the volume of the said reservoir above the said mouth is greater than the combined volumes of the intake pipe for the said reservoir, the supply line from the refueling tank, and the said intake element.

10. Means for indicating to an operator engaged in replenishing the supply of fluid in a reservoir that the fluid in said reservoir has reached a certain predetermined point which consists of the combination of a tubular element positioned in the said reservoir so that its free end is at the said predetermined point; a substantially air tight indicating chamber having its floor member attached to the other end of the said tubular means and positioned so as to be visible to the said operator; a wheel mounted for rotation in the said indicating chamber and positioned so that at least one of the spokes thereof will always be in the path of the fluid entering the said indicating chamber; a gasoline motor; tubular means connecting the said indicating chamber with the intake manifold of the said gasoline motor; and a vacuum gauge and a two way valve positioned in the said tubular means connecting the indicating chamber and intake manifold, the said valve in one of its positions permitting only communication between the said indicating chamber and the said intake manifold and, in the other of its positions permitting only the communication between the said chamber and the atmosphere.

11. The method of determining when sufficient oil has been added to a reservoir the fluid supply of which is being replenished through a reservoir intake pipe and a refueling supply line which consists in inserting a tubular element into the top of the said reservoir a distance such that the volume of the said reservoir above the terminal point of the said tubular element is greater than the combined volumes of said reservoir intake pipe, of said refueling supply line and of the said tubular element, attaching an indicating chamber to the said tubular element, forming at least a partial vacuum in the said tubular element and indicating chamber, and maintaining the said vacuum until the fluid becomes visible in the said indicating chamber.

12. The method of determining when sufficient oil has been added to a reservoir the fluid supply of which is being replenished through a reservoir intake pipe and a refueling supply line which consists in inserting a tubular element into the top of the said reservoir a distance such that the volume of the said reservoir above the terminal point of the said tubular element is greater than the combined volumes of said reservoir intake pipe, of said refueling supply line and of the said tubular element, attaching an indicating chamber to the said tubular element, forming at least a partial vacuum in the said tubular element and indicating chamber, maintaining the said vacuum until the fluid becomes visible in the said indicating chamber, and causing an ebullience in the fluid drawn into the said indicating chamber.

13. A device for indicating when sufficient fluid has been added to a reservoir, having an intake pipe, the fluid supply of which is being replenished, by means of a supply line communicating with the said intake pipe, which consists of an intake element having one of its ends positioned within the said reservoir and the other of its ends terminating at a point outside the chamber within which the said reservoir is situated, an indicating chamber positioned outside of the chamber within which the said reservoir is situated, tubular means connecting the said indicating chamber with that end of the intake element terminating outside of the said reservoir chamber, and evacuating means connected to the said indicating chamber, the mouth of the said intake element being positioned at a point within the said reservoir where the volume of the said reservoir above the said mouth is greater than the combined volumes of the intake pipe for the said reservoir, the supply line from the refueling tank, the said intake element, and the said tubular means connecting the said indicating chamber with the said intake element.

14. A device for indicating when sufficient fluid has been added to a reservoir, having an intake pipe, the fluid supply of which is being replenished, by means of a supply line communicating with the said intake pipe, which consists of a tubular member the intake end of which is positioned at a point within the said reservoir and the other end of which terminates at a point outside of the chamber within which the said reservoir is situated, an indicating chamber connected with that end of the tubular member terminating outside of the said reservoir chamber, evacuating means connected to the said indicating chamber, the intake end of the said tubular member being positioned at a point within the said reservoir where the volume of the said reservoir above the said end is greater than the combined volumes of the intake pipe of the said reservoir, the supply line from the refueling tank, and the said tubular member.

15. A device for indicating when sufficient fluid has been added to a reservoir having an intake pipe, the fluid supply of which is being replenished, by means of a supply line communicating with the said intake pipe, which consists of an intake element having one of its ends positioned within the said reservoir and the other of its ends terminating at a point outside the chamber within which the said reservoir is situated, an indicating chamber connected with that end of the intake element terminating outside of the said reservoir chamber, and evacuating means connected to the said indicating chamber, the mouth of the said intake element being positioned at such a point within the said reservoir where the volume of the said reservoir above the said mouth is greater than the combined volumes of the intake pipe for the said reservoir, the supply line from the refueling tank, and the said intake element.

WILL N. CLURMAN.